(12) United States Patent
Harada

(10) Patent No.: US 12,262,721 B2
(45) Date of Patent: Apr. 1, 2025

(54) WHOLE FAT TEXTURED PROTEIN HAVING HIGH STORAGE STABILITY

(71) Applicant: PELICAN CORPORATION, Okegawa (JP)

(72) Inventor: Hiroshi Harada, Saitama (JP)

(73) Assignee: PELICAN CORPORATION, Saitama (JP)

( * ) Notice: Subject to any disclaimer, the term of this patent is extended or adjusted under 35 U.S.C. 154(b) by 0 days.

(21) Appl. No.: 18/573,414

(22) PCT Filed: May 23, 2022

(86) PCT No.: PCT/JP2022/021081
§ 371 (c)(1),
(2) Date: Dec. 21, 2023

(87) PCT Pub. No.: WO2022/270190
PCT Pub. Date: Dec. 29, 2022

(65) Prior Publication Data
US 2024/0260606 A1     Aug. 8, 2024

(30) Foreign Application Priority Data
Jun. 22, 2021  (JP) .................. 2021-103457

(51) Int. Cl.
*A23J 3/16*   (2006.01)
*A23J 3/22*   (2006.01)
*A23L 11/00*  (2021.01)

(52) U.S. Cl.
CPC ................ *A23J 3/16* (2013.01); *A23J 3/227* (2013.01); *A23L 11/07* (2016.08)

(58) Field of Classification Search
CPC ............. A23J 3/16; A23J 3/227; A23L 11/07
USPC ....................................... 426/656
See application file for complete search history.

(56) References Cited

U.S. PATENT DOCUMENTS 4,369,195 A    1/1983   Nelson et al.

FOREIGN PATENT DOCUMENTS

| JP | S54-037845 A | 3/1979 |
|---|---|---|
| JP | S56-055158 A | 5/1981 |
| JP | S60-199350 A | 10/1985 |
| JP | S60-221041 A | 11/1985 |
| JP | S61-058539 A | 3/1986 |
| JP | S62-186752 A | 8/1987 |
| JP | S63-240749 A | 10/1988 |
| JP | S64-067153 A | 3/1989 |
| JP | H04-030756 A | 2/1992 |
| JP | H04-084862 A | 3/1992 |
| JP | H04-299955 A | 10/1992 |
| JP | 2003-079320 A | 3/2003 |
| JP | 2008-017831 A | 1/2008 |
| JP | 4928688 B2 | 5/2012 |
| JP | 2016-182107 A | 10/2016 |

OTHER PUBLICATIONS

Office Action issued in Chinese Application No. 202280040119.4, dated Mar. 22, 2024.
Haichen et al., "Grain and oil food processing technology," China Light Industry Press, Beijing, ISBN 978-7-5184-2268-5, Sep. 2020, pp. 155-156.
International Search Report Issued in Application No. PCT/JP2022/021081, Mailing date Jul. 19, 2022.
"Syokuhin Sangyo Shinbunsha News Web—Soybean, Oil", Jan. 22, 2021, https://www.ssnp.co.jp, Syokuhin Sangyo Shinbunsha Co., Ltd.
Nobuyuki Hayashi et al., "Texture Evaluation of Dehulled Whole Soybean Extrudate Treated with a Twin-screw Extruder", Nippon Shokuhin Kogyo Gakkaishi, vol. 38, No. 9, pp. 842-849, https://doi.org/10.3136/nskkk1962.38.842, J-STAGE.
Yoshiko Kagawa (supervised by), "7th revised edition Food Igredient Table 2016", First edition, 2016, pp. 34-35, Joshi Nutrition University Publishing Division.
Rejection Decision issued in Chinese Application No. 202280040119.4, dated Jun. 28, 2024 (with partial translation).
Search Report issued in European Application No. 22828109.3-1105, dated Dec. 13, 2024.
Hamida et al, "Production and Quality Evaluation of Extruded Full-Fat Soy Flower," PCSIR Laboratories Complex, Pakistan J. Sci. Ind. Res, XP093230167, pp. 48-52, Jan. 1, 2006.
Mustakas et al, "Full-Fat Soybean Flour by Continuous Extrusion Cooking," Advances in Chemistry, XP093230168, pp. 101-111, Jan. 1, 1966.

*Primary Examiner* — Subbalakshmi Prakash
(74) *Attorney, Agent, or Firm* — MICHAEL BEST & FRIEDRICH LLP

(57) ABSTRACT

In order to provide a means for preventing a full-fat textured protein from being degraded through oxidation at the time of storage, provided are a full-fat textured protein excellent in storage stability and a method of producing the full-fat textured protein. The full-fat textured protein includes, as a raw material, a soybean having an oil content of from 15 mass % to 30 mass %, has an oil content of from 15 mass % to 30 mass %, and is in a textured form. A suitable full-fat textured protein includes, as a raw material, a soybean having a protein content of from 25 mass % to 60 mass %, has a protein content of from 25 mass % to 60 mass %, and is in a textured form.

6 Claims, No Drawings

WHOLE FAT TEXTURED PROTEIN HAVING HIGH STORAGE STABILITY

TECHNICAL FIELD

The present invention relates to a full fat textured protein excellent in storage stability. More specifically, the present invention relates to a full-fat textured protein and a method of producing the full-fat textured protein.

BACKGROUND ART

As a method of producing a textured protein, there has hitherto been proposed a production method including using defatted soybean powder as a raw material and an extrusion molding machine (Patent Document 1). Further, there have been proposed use of a defatted soybean having a nitrogen solubility index (NSI) of 40 or less as a raw material (Patent Document 2) and use of wheat gluten in combination (Patent Document 3). In addition, there has also been disclosed a technology in which a whole soybean is ground and texturized with an extruder (Patent Document 4). Further, there has also been proposed a method including adding a soybean having been subjected to heat treatment in an aqueous system to a soybean protein (Patent Document 5).

In addition, there has also been disclosed a production method including adding an oil to an oil seed protein and using an extruder having twin screws (twin-screw extruder) (Patent Document 6). Further, there has also been described a method of producing snack like food including using whole beans (Patent Document 7). In addition, in recent years, as a method of producing vegetable meat (meat-like food derived from a plant including a soybean or the like as a main raw material), there has also been proposed a method including using a whole soybean to form soy milk and subjecting the soy milk to mixing and extrusion treatment (Patent Document 8). Further, there has been described that, in a method of producing a granule protein in which a black grain derived from a germ of a defatted soybean is made inconspicuous, a fraction having a particle diameter of 200 μm or more is set to 15% or less and a NSI is set to 80 or more (Patent Document 9).

Although each of the literatures includes a mention of texturization or fiberization, there is no description of the storage stability of the product. In general, a protein is a main factor in such texturization or fiberization, and an oil and fat does not contribute to the fiberization. Accordingly, a method including using a defatted soybean or extracting an oil content through squeezing has been used (Non Patent Document 1).

In addition, there has also been reported an example in which a 0.95 mm pass (20 mesh pass) product from a peeled whole soybean is subjected to extruder treatment (Non Patent Document 2). However, the result is that a fibrous protein including an oil content is oxidized with oxygen in air and is hence insufficient in storage stability, and there has not been reported a full-fat fibrous protein having satisfactory storage stability obtained by using a whole soybean without removing an oil content therefrom.

PRIOR ART DOCUMENTS

Patent Documents

Patent Document 1: JP Sho 54-37845 A
Patent Document 2: JP Sho 56-55158 A
Patent Document 3: JP Sho 60-221041 A
Patent Document 4: JP 4928688 B2
Patent Document 5: JP Hei 04-84862 A
Patent Document 6: JP Hei 04-30756 A
Patent Document 7: JP Sho 61-58539 A
Patent Document 8: JP 2008-17831 A
Patent Document 9: JP 2016-182107 A

Non Patent Documents

Non Patent Documents 1: Shokuhin Sangyo Shimbunsha Co., Ltd., article on Jan. 22, 2021
Non Patent Documents 2: Journal of the Japanese Society for Food Science and Technology, Vol. 38, No. 9, pp. 842-849

DISCLOSURE OF THE INVENTION

Problems to be Solved by the Invention

An object of the present invention is to provide means for preventing a full-fat textured protein from being degraded through oxidation at the time of storage.

According to one embodiment of the present invention, there is provided a full-fat textured protein excellent in storage stability.

According to another embodiment of the present invention, there is provided a method of producing a full-fat textured protein excellent in storage stability.

Means for Solving the Problems

The inventor of the present invention has made extensive investigations, and as a result, has found that a full-fat textured protein excellent in storage stability is obtained by grinding a whole soybean, processing the ground soybean under certain conditions in terms of particle size, NSI and oil exudation, and molding the soybean with an extruder. Thus, the inventor has reached the present invention.

That is, according to a first aspect of the present invention, there is provided a full-fat textured protein, which includes, as a main raw material, a soybean having an oil content of from 15 mass % to 30 mass %, has an oil content of from 15 mass % to 30 mass %, and is in a textured form.

According to a second aspect of the present invention, there is provided a full fat textured protein, which includes, as a main raw material, a soybean having a protein content of from 25 mass % to 60 mass %, has a protein content of from 25 mass % to 60 mass %, and is in a textured form.

According to a third aspect of the present invention, there is provided a full-fat textured protein, which includes, as a main raw material, a soybean having an oil content of from 15 mass % to 30 mass % and a protein content of from 25 mass % to 60 mass %, has an oil content of from 15 mass % to 30 mass % and a protein content of from 25 mass % to 60 mass %, and is in a textured form.

It is suitable that the soybean be a whole soybean or a dehulled soybean.

It is preferred that the soybean to be used be a ground soybean obtained by grinding a soybean.

It is suitable that 99% or more of particles of the ground soybean each have a particle diameter within a range of from 5 mm pass to 900 mesh pass.

It is preferred that the ground soybean have a nitrogen solubility index (NSI) of from 30 to 80.

It is suitable that the ground soybean be prevented from showing oil exudation during pressurization treatment at a pressure of 0.8 MPa with a squeezing machine.

According to another aspect of the present invention, there is provided a method of producing the full fat textured protein, including an extruder treatment step including using a single-screw or twin-screw extruder.

Advantageous Effects of the Invention

According to the present invention, the full-fat textured protein excellent in storage stability and the method of producing the same can be provided. In addition, according to the present invention, the means for preventing the full-fat textured protein from being degraded through oxidation at the time of storage can be provided.

Further, the full-fat textured protein of the present invention is suitable as a raw material for meat like food, and can also achieve an effect of being capable of providing meat like food excellent in texture, taste and flavor.

MODE FOR CARRYING OUT THE INVENTION

Embodiments of the present invention are described below. However, those embodiments are described as examples, and hence it is understood that various modifications may be made thereto without departing from the technical spirit of the present invention.

A full-fat textured protein according to a first aspect of the present invention includes, as a main raw material, a soybean having an oil content of from 16 mass % to 30 mass %, has an oil content of from 15 mass % to 30 mass %, and is in a textured form. Herein, "mass %" is sometimes simply referred to as "%".

The full-fat textured protein of the present invention can be suitably produced by a method including subjecting raw materials including a soybean having an oil content of from 15 mass % to 30 mass % as a main raw material to texturization processing treatment with an extruder. The range of the oil content is set for the following reasons: when the range of the oil content is less than 15%, oil and fat exudation is not observed in the extruder treatment, and hence storage stability is not originally affected; and when the range of the oil content is more than 30%, oil exudation occurs in the extruder treatment, and the stability is reduced.

Accordingly, when a non-defatted soybean (preferably, a full-fat soybean) having an oil content of from 15 mass % to 30 mass % is used as a main raw material, a full-fat textured protein, which has an oil content of from 15 mass % to 30 mass %, has such extremely excellent storage stability as not to be degraded through oxidation at the time of storage, and is in a textured form, can be obtained.

The full-fat textured protein of the present invention has an advantage of having more excellent storage stability than a textured protein obtained by using a defatted soybean and separately adding an oil content thereto.

In the present invention, the "oil content" means a percentage of a substance extracted from a sample with diethyl ether with respect to the sample, and may be measured based on 1.5-2013 Oil Content in Standard Methods for the Analysis of Fats, Oils and Related Materials (established by Japan Oil Chemists' Society).

The soybean serving as a raw material has an oil content of 15% or more and 30% or less, preferably 18% or more and 28% or less.

The full-fat textured protein has an oil content of 15% or more and 30% or less, preferably 18% or more and 28% or less.

In the present invention, the "textured form" means that the full-fat textured protein is formed into a fibrous form and has a meat-like texture.

A full-fat textured protein according to a second aspect of the present invention includes, as a main raw material, a soybean having a protein content of from 25 mass % to 60 mass %, has a protein content of from 25 mass % to 60 mass %, and is in a textured form. The protein content is set for the following reasons: when the protein content is less than 25%, fiberization hardly occurs; and there exists no raw material having a protein content of more than 60%.

Accordingly, when the soybean having a protein content of from 25% to 60% is used as a main raw material, a textured protein, which has a protein content of from 25 mass % to 60 mass % and is satisfactorily texturized, can be obtained.

The full-fat textured protein of the present invention has an advantage of achieving more excellent sensory evaluation than a related-art textured protein obtained by a method including separately adding a soybean protein having been adjusted.

The soybean serving as a raw material has a protein content of 25% or more and 60% or less, preferably 30% or more and 50% or less.

The full-fat textured protein has a protein content of 25% or more and 60% or less, preferably 30% or more and 50% or less.

The protein content in each of the soybean and the full-fat textured protein may be determined as follows: a total nitrogen amount of a sample is measured by a Kjeldahl method in conformity with 1.7-2013 Total Nitrogen and Crude Protein in Standard Methods for the Analysis of Fats, Oils and Related Materials (established by Japan Oil Chemists' Society), and a protein content is calculated therefrom through use of 5.71 as a nitrogen-to-protein conversion factor of a soybean.

A full-fat textured protein according to a third aspect of the present invention includes, as a main raw material, a soybean having an oil content of from 15 mass % to 30 mass % and a protein content of from 25 mass % to 60 mass %, has an oil content of from 15 mass % to 30 mass % and a protein content of from 25 mass % to 60 mass %, and is in a textured form.

When the soybean having an oil content of from 15 mass % to 30 mass % and a protein content of from 25 mass % to 60 mass % is used as a main raw material, a full-fat textured protein, which has an oil content of from 15 mass % to 30 mass % and a protein content of from 25 mass % to 60 mass %, has such extremely excellent storage stability as not to be degraded through oxidation at the time of storage, and is satisfactorily texturized into a textured form, can be obtained.

Further, such full-fat textured protein having an oil content of from 15 mass % to 30 mass % and a protein content of from 25 mass % to 60 mass % is excellent in storage stability, and besides, is suitable as a raw material for meat-like food and can provide meat-like food excellent in texture, taste and flavor.

Any edible soybean (including IP handling) may be used as the soybean serving as a raw material whether the kind of the soybean is a domestic one or a foreign one. It is suitable that the soybean be a whole soybean or a dehulled soybean.

It is preferred that the soybean to be used be a ground soybean obtained by grinding a soybean. The degree of grinding of the ground soybean is not particularly limited, and any of a coarsely ground soybean, such as in a half-split form, in a crushed form or in a coarse granule form, obtained by coarse grinding, a ground soybean in a powder form obtained by medium grinding or fine grinding or a ground soybean in a flake form obtained by flaking may be used. Herein, the "ground soybean in a powder form" is referred to as "soybean flour".

It is suitable that 99% or more of particles of the ground soybean each have a particle diameter within the range of from 5 mm pass to 900 mesh (16 μm) pass. In addition, when the ground soybean is the soybean flour, it is suitable that 90% or more of particles of the soybean flour each have a particle diameter within the range of from 100 mesh (140 μm) pass to 800 mesh (18 μm) pass. The particle diameter is set for the following reasons: when soybean flour having a particle size of less than 100 mesh is mixed in a large amount, oil exudation occurs at the time of the extruder treatment, and oxidation stability is reduced; and when soybean flour having a particle diameter of more than 800 mesh is to be obtained in a large amount, an oil body is broken at the time of preparation of the soybean flour, and oil exudation may occur at the stage of the raw material soybean flour.

The particle diameter of the ground soybean may be measured with a particle size distribution analyzer.

It is preferred that the ground soybean have a nitrogen solubility index (NSI) of from 30 to 80. The NSI is set for the following reasons: there are drawbacks in that, when the NSI is less than 30, fiberization becomes difficult, and when the NSI is more than 80, a heat inactivation effect is difficult to obtain.

The NSI is an index (unit: %) representing a ratio of water soluble nitrogen with respect to total nitrogen in a sample, and the NSI of the ground soybean may be calculated based on 1.8.1-2013 Nitrogen Solubility Index (40° C. Extraction) in Standard Methods for the Analysis of Fats, Oils and Related Materials (established by Japan Oil Chemists' Society).

It is suitable that the ground soybean be prevented from showing oil exudation at the time of pressurization treatment in a pressurization test at a pressure of 0.8 MPa with a squeezing machine. This is because a product obtained by using a raw material showing oil exudation in the pressurization test and subjecting the raw material to the extruder treatment has a drawback of having extremely low oxidation stability.

Any machine that is called a general squeezing machine may be used for the pressurization in the pressurization test without particular limitations. As the conditions of the pressurization test, the ground soybean is treated at normal temperature. In addition, a sample prepared by a method including placing the sample in a measurement container is suitably used for the pressurization test.

The production of the ground soybean is desirably performed through the following steps (A) to (E):

(A) a sorting step for a soybean→(B) a dehulling step→(C) a heat inactivation step→(D) a drying step→(E) a grinding step.

Of those steps, the dehulling step (B) may be performed as required.

The sorting step (A) is performed for the purpose of separating a soybean from other foreign matter, and is suitably performed through a sieving step, a color sorting step or the like.

The dehulling step (B) is a step of separating a soybean cotyledon from a soybean hull and a soybean hypocotyl, and is suitably performed through a heating step, a peeling step, a color sorting step, a winnowing step or the like.

In the heat inactivation step (C), a known deodorizer may be utilized. With regard to steaming, the treatment is performed with hot water or water vapor, and is suitably performed in the temperature range of from 70° C. to 125° C. (preferably in the temperature range of from 86° C. to 105° C.) for from 60 seconds to 300 seconds. In particular, the heat treatment is preferably performed so that the soybean flour to be obtained has a NSI in the range of from 30 to 80.

In the drying step (D), a known dryer may be utilized. The drying step (D) is suitably performed through a step of performing drying until a water content becomes about 7 mass % or less (preferably from 6 mass % to 7 mass %).

The grinding step (E) is suitably performed by grinding the soybean so as to have a predetermined particle diameter with a known grinder. The degree of grinding in the grinding step (E) is not particularly limited, and coarse grinding (coarse grinding into a half-split form, a crushed form, a coarse granule form or the like), middle grinding, fine grinding or the like may be appropriately selected as required.

When the soybean flour is used as the ground soybean, the grinding step (E) is desirably performed in two stages of coarse grinding and fine grinding. The grinding step (E) is suitably performed through a step of grinding the soybean to from 20 mesh pass to 40 mesh pass (from 380 μm pass to 860 μm pass) through coarse grinding, followed by grinding the soybean to from about 100 mesh pass to about 800 mesh pass (from about 18 μm pass to about 140 μm pass) through fine grinding.

The full-fat textured protein that is texturized can be obtained by subjecting a raw material composition for the full-fat textured protein including the above-mentioned soybean as a raw material to processing treatment with an extruder.

A known extruder may be used for texturization, and an extruder having a single screw or twin screws is suitably used. From the viewpoint of production stability, the twin-screw extruder is desirably used.

The raw material composition for the full-fat textured protein includes the soybean as a main raw material. The ratio of the soybean in the raw material composition is preferably from 50% to 100%, more preferably from 75% to 100%.

The raw material composition for the full-fat textured protein may include a component other than the soybean. Examples of the component other than the soybean include water, other additives (e.g., modified starch) and dietary fibers.

The raw material composition suitably has an oil content of from 15% to 30%.

The raw material composition suitably has a protein content of from 25% to 60%.

The raw material composition has a water content of preferably from 1% to 15%, more preferably from 3% to 13%.

A method of producing a full-fat textured protein according to the present invention is a method of producing the full-fat textured protein described above, including an extruder treatment step including using a single screw or twin-screw extruder.

Through use of the extruder, a full-fat textured protein, which has the same component composition as the raw material composition and is satisfactorily texturized, can be easily produced.

EXAMPLES

Now, the present invention is more specifically described by way of Examples. It goes without saying that Examples are given for illustrative purposes and should not be interpreted as limiting the present invention.

Example 1

A soybean made in the United States of America subjected to IP handling (whole soybean, oil content: 22%, protein content: 33%) was used as a raw material. In Example 1, the oil content in the soybean was measured in accordance with Standard Methods for the Analysis of Fats, Oils and Related Materials as described above. The protein content in the soybean was measured in conformity with Standard Methods for the Analysis of Fats, Oils and Related Materials as described above.

First, a sorting step was performed as described below, and a sorted soybean was thus obtained from the raw material soybean.

100 Kilograms of the raw material soybean was prepared. The raw material soybean was subjected to a commercially available coarse sorting machine for removing foreign matter larger than the soybean (corn, a mud lump or the like) or foreign matter smaller than the soybean (a grass seed, a morning glory seed or the like) therefrom, was subjected to a commercially available gravity separator for removing light-weight foreign matter (dust, a hull, small trash or the like) therefrom, was subjected to a commercially available stone removing machine for removing mixed-in foreign matter heavier than the soybean, such as stone, therefrom, was passed through a commercially available roll sorting machine for removing irregular-shaped matter therefrom, and was subjected to a commercially available particle size sorting machine for sorting the soybean according to particle diameter.

Next, a dehulling step was performed as described below, and a sterile dehulled soybean was thus obtained.

The sorted soybean was heated with a commercially available heater at a hot air temperature of about 100° C. and a product temperature of about 60° C. for about 5 minutes, and the heated soybean was subjected to a commercially available auxiliary dehulling machine (the machine was used under the conditions of a gap between two rubber rollers of from 1 mm to 5 mm; a number of revolutions of one of the two rubber rollers of 809 rpm; a number of revolutions of the other one of the two rubber rollers of 1,050 rpm; and a difference in number of revolutions between these rollers of about 20%) to generate cracks on the soybean.

The soybean having generated thereon cracks was peeled with a commercially available peeling machine (the number of revolutions of a plurality of blades was set to 300 rpm), and about half of the peeled hull was removed with a dust collector. Part of the peeled hull not having been removed with the dust collector was removed with a commercially available winnowing machine.

A soybean mixture remaining after the removal of the hull was subjected to a commercially available multi-stage sieving device to be separated into a cotyledon and a germ. That is, the soybean mixture having been subjected to the winnowing treatment was subjected to a first sieve to be separated into a whole soybean still not having been dehulled (un-dehulled whole soybean) and a mixture of a cotyledon separated into two cotyledons (half-split cotyledon) and a germ. Next, the mixture of the cotyledon and the germ was subjected to a second sieve to be separated into the half-split cotyledon and the germ.

While some hulls remained on the separated cotyledon, the hulls remaining on the cotyledon were separated by cooling the separated cotyledon through wind cooling at normal temperature with a commercially available cooling tank (equipped with a cooling fan, volume: about 8 m$^3$), and subjecting the cooled cotyledon to peeling treatment again with a commercially available peeling machine.

The resultant cotyledon was measured for a bacterial count in conformity with "Standard Methods of Analysis in Food Safety Regulation" (supervised by Environmental Health Bureau of Ministry of Health, Labour and Welfare), and it was recognized through an inspection that the bacterial count was 300 cells/g or less.

The cotyledon (sterile dehulled soybean) obtained through the sorting step for the raw material soybean and the dehulling step was subjected to steaming with superheated steam at a temperature of 105° C. for 120 seconds with a steamer (manufactured by Eiyu industry Ltd.), and was then subjected to a drying step with a dryer. Thus, a soybean intermediate product having a water content of 6% was obtained.

The soybean intermediate product was ground (grinding step) so as to have a predetermined particle diameter with a fine impact mill with a built-in classifier (ACM Pulverizer). Thus, a ground soybean in a powder form (soybean flour, oil content: 22%, protein content: 33%, water content: 6%) was obtained.

The particle diameter (particle size) of the resultant ground soybean was measured with a particle size distribution analyzer (MT-3000II manufactured by MicrotracBEL Corporation), and a particle size range of a particle size distribution in which 90% or more or 99% or more of particles were present was determined. The results are shown in Table 1. In the table, the unit of a numerical value for the particle size measurement is "mesh pass".

The NSI of the resultant ground soybean was measured in accordance with Standard Methods for the Analysis of Fats, Oils and Related Materials as described above. The results are shown in Table 1.

(Pressurization Test)

A squeezing machine (manufactured by KENIS LIMITED, Table Press Machine TB-20H) was used, and 10 g of the resultant ground soybean was subjected to the squeezing machine to be pressurized at a pressure of 0.8 MPa. After that, the presence or absence of oil exudation was visually observed. The results are shown in Table 1.

(Extruder Treatment)

A twin-screw extruder (manufactured by SUEHIRO EPM CORPORATION, EA-100) was used, and the resultant ground soybean was fed as a raw material to the extruder from a feed barrel. Kneading screws were combined with a middle barrel and a tip barrel, and an outlet temperature was set to 220° C. Thus, a full-fat textured protein was obtained.

In Example 1, the ground soybean prepared as described above was used alone as a raw material, and hence the resultant full fat textured protein has the same oil content and protein content as those of the ground soybean serving as a raw material.

The texturization of the full fat textured protein was evaluated based on Chewability Measurement Method in Japanese Agricultural Standard for Vegetable Protein specified in JAS 0838 (revised by Notification No. 489 of Ministry of Agriculture, Forestry and Fisheries on Feb. 24, 2016). A protein having chewability was evaluated as being satisfactorily texturized, and a protein not having chewability was evaluated as being poorly texturized. The results are shown in Table 1.

(Storage Stability Test)

The resultant full-fat textured protein was stored in a constant-temperature bath at 50° C. for 7 days, and was then measured for a deterioration odor through sensory evaluation. The results are shown in Table 1.

TABLE 1

| | Sample name | | | | |
|---|---|---|---|---|---|
| | Example 1 | Example 2 | Example 3 | Example 4 | Experimental Example 1 |
| Particle size [mesh pass] | | | | | |
| Particle size (90% or more) | 300 to 750 | 200 to 650 | 250 to 650 | 150 to 350 | 4 to 830 |
| Particle size (99% or more) | 350 to 700 | 300 to 600 | 350 to 600 | 200 to 300 | 10 to 700 |
| NSI | 76 | 68 | 80 | 70 | 75 |
| Pressurization test*1 | Good | Good | Good | Good | Good |
| Texturization*2 | Good | Good | Good | Good | Good |
| Sensory test*3 | Good | Good | Good | Good | Good |

*1Good: Oil exudation is absent, Bad: Oil exudation is present.
*2Good: Satisfactorily texturized, Bad: Poorly texturized.
*3Good: No foreign odor is sensed, Average: A foreign odor is sensed, Bad: A strong foreign odor is sensed.

Example 2

A soybean made in the United States of America subjected to IP handling (whole soybean, oil content: 29%, protein content: 30%) was used as a raw material. A soybean intermediate product having a water content of 6% was obtained through use of the raw material soybean by the same method as in Example 1, and the soybean intermediate product was then ground. Thus, a ground soybean in a powder form (soybean flour, oil content: 29%, protein content: 30%, water content: 6%) was obtained.

The resultant soybean flour was subjected to the same measurements as in Example 1. The results are shown in Table 1.

The resultant soybean flour was used as a raw material, and was subjected to the same extruder treatment as in Example 1. Thus, a full-fat textured protein was obtained. The resultant full-fat textured protein was subjected to various tests by the same methods as in Example 1. The results are shown in Table 1.

Example 3

A domestic soybean for processing (whole soybean, oil content: 20%, protein content: 45%) was used as a raw material. A soybean intermediate product having a water content of 6% was obtained through use of the raw material soybean by the same method as in Example 1, and the soybean intermediate product was then ground. Thus, a ground soybean in a powder form (soybean flour, oil content: 20%, protein content: 45%, water content: 6%) was obtained.

The resultant soybean flour was subjected to the same measurements as in Example 1. The results are shown in Table 1.

The resultant soybean flour was used as a raw material, and was subjected to the same extruder treatment as in Example 1. Thus, a full-fat textured protein was obtained. The resultant full-fat textured protein was subjected to various tests by the same methods as in Example 1. The results are shown in Table 1.

Example 4

A soybean made in the United States of America subjected to IP handling (whole soybean, oil content: 22%, protein content: 33%) was used as a raw material. A soybean intermediate product having a water content of 6% was obtained through use of the raw material soybean by the same method as in Example 1, and the soybean intermediate product was then ground by changing a target particle diameter from that of Example 1. Thus, a ground soybean in a powder form (soybean flour, oil content: 22%, protein content: 33%, water content: 6%) was obtained.

The resultant soybean flour was subjected to the same measurements as in Example 1. The results are shown in Table 1.

The resultant soybean flour was used as a raw material, and was subjected to the same extruder treatment as in Example 1. Thus, a full-fat textured protein was obtained. The resultant full-fat textured protein was subjected to various tests by the same methods as in Example 1. The results are shown in Table 1.

Experimental Example 1

A ground soybean in a crushed form (crushed ground soybean, oil content: 22%, protein content: 33%, water content: 6%) was obtained by the same method as in Example 1 except that the conditions of the grinding step for the soybean intermediate product were changed as described below. In the grinding step of Experimental Example 1, the grinding was performed by using a pin mill-type grinder as the grinder and changing a target particle diameter from that of Example 1.

The resultant crushed ground soybean was subjected to the same measurements as in Example 1. The results are shown in Table 1.

The resultant crushed ground soybean was used as a raw material, and was subjected to the same extruder treatment as in Example 1. Thus, a full-fat textured protein was obtained. The resultant full-fat textured protein was subjected to various tests by the same methods as in Example 1. The results are shown in Table 1.

Comparative Example 1

A domestic soybean subjected to IP handling (whole soybean, oil content: 22%, protein content: 33%) was used as a raw material. A soybean intermediate product having a water content of 6% was obtained through use of the raw material soybean by the same method as in Example 1, and the soybean intermediate product was then ground. Thus, soybean flour was obtained.

78 Parts by mass of an oil content was added to 100 parts by mass of the soybean flour to provide soybean flour having an oil content of 55%. Thus, a raw material composition (oil content: 55%, protein content: 19%, water content: 3%) before extruder treatment was prepared.

The raw material composition having an oil content of 55% was subjected to the same measurements as in Example 1. The results are shown in Table 2.

The resultant raw material composition was subjected to extruder treatment by the same method as in Example 1. Thus, an extruder treatment product was obtained. The resultant extruder treatment product was subjected to various tests by the same methods as in Example 1. The results are shown in Table 2.

TABLE 2

|  | Sample name | | |
| --- | --- | --- | --- |
|  | Comparative Example 1 | Comparative Example 2 | Comparative Example 3 |
| Particle size [mesh pass] | | | |
| Particle size (90% or more) | 250 to 650 | 200 to 550 | 100 to 450 |
| Particle size (99% or more) | 350 to 650 | 300 to 500 | 150 to 400 |
| NSI | 75 | 25 | 65 |
| Pressurization test*1 | Bad | Good | Good |
| Texturization*2 | Good | Bad | Bad |
| Sensory test*3 | Bad | Good | Average |

*1Good: Oil exudation is absent, Bad: Oil exudation is present.
*2Good: Satisfactorily texturized, Bad: Poorly texturized.
*3Good: No foreign odor is sensed, Average: A foreign odor is sensed, Bad: A strong foreign odor is sensed.

Comparative Example 2

A domestic soybean subjected to IP handling (whole soybean, oil content: 22%, protein content: 33%) was used as a raw material.

The raw material soybean was used, and a cotyledon obtained therefrom through a sorting step and a dehulling step was subjected to steaming with superheated steam at a temperature of 130° C. for 350 seconds with a steamer (manufactured by Eiyu industry Ltd.), and was then subjected to a drying step. Thus, a soybean intermediate product having a water content of 6% was obtained. The soybean intermediate product was ground with ACM Pulverizer. Thus, soybean flour (oil content: 22%, protein content: 33%, water content: 6%) was obtained.

The resultant soybean flour was subjected to the same measurements as in Example 1. The results are shown in Table 2.

The resultant soybean flour was used as a raw material, and was subjected to extruder treatment by the same method as in Example 1. Thus, an extruder treatment product was obtained. The resultant extruder treatment product was subjected to various tests by the same methods as in Example 1. The results are shown in Table 2.

Comparative Example 3

A domestic soybean subjected to IP handling (whole soybean, oil content: 22%, protein content: 33%) was used as a raw material. A soybean intermediate product having a water content of 6% was obtained through use of the raw material soybean by the same method as in Example 1, and the soybean intermediate product was then ground. Thus, soybean flour was obtained.

65 Parts by mass of dietary fibers were added to 100 parts by mass of the soybean flour to prepare a raw material composition having a protein content of 20% (oil content: 13%, protein content: 20%, water content: 3%).

The raw material composition was subjected to the same measurements as in Example 1. The results are shown in Table 2.

The resultant raw material composition was subjected to extruder treatment by the same method as in Example 1. Thus, an extruder treatment product was obtained. The resultant extruder treatment product was subjected to various tests by the same methods as in Example 1. The results are shown in Table 2.

As shown in Table 1, the full-fat textured proteins of Example 1 to Example 4 were each satisfactorily texturized and also excellent in storage stability. Meanwhile, in Comparative Example 1, in which the raw material composition having an oil content of 55% was used, the product had extremely low storage stability. In Comparative Example 2, in which the soybean flour having a NSI of 25 was used, the product was poorly texturized. In Comparative Example 3, in which the raw material composition having a protein content of 20% was used, the product was poorly texturized and also had low storage stability.

The invention claimed is:

1. A full-fat textured protein, which is formed from a soybean raw material being texturized with a single-screw extruder or a twin-screw extruder, and is in a textured form,
    wherein the soybean raw material, prior to being texturized with the single-screw extruder or the twin-screw extruder, has a water content of 6 mass % or more and 7 mass % or less,
    wherein the soybean raw material, prior to being texturized with the single-screw extruder or the twin-screw extruder, has an oil content of from 15 mass % to 30 mass % and a protein content of from 25 mass % to 60 mass %,
    wherein the soybean raw material, prior to being texturized with the single-screw extruder or the twin-screw extruder, is a ground soybean in a powder form obtained by grinding a soybean, 90% or more of particles of the soybean raw material each have a particle diameter within a range of from 100 mesh pass to 800 mesh pass, and the soybean raw material has a nitrogen solubility index (NSI) of from 30 to 80,
    wherein the soybean raw material, prior to being texturized with the single-screw extruder or the twin-screw extruder, does not show oil exudation during pressurization treatment at a pressure of 0.8 MPa with a squeezing machine,
    wherein the soybean raw material, prior to being texturized with the single-screw extruder or the twin-screw extruder, has a ratio of the soybean of 100 mass %, and
    wherein the full-fat textured protein has an oil content of from 15 mass % to 30 mass % and a protein content of from 25 mass % to 60 mass %.

2. The full-fat textured protein according to claim 1, wherein the soybean is a whole soybean or a dehulled soybean.

3. A method of producing the full-fat textured protein of claim 1, comprising:
    a grinding step of grinding a soybean to prepare a ground soybean in a powder form as a soybean raw material, the soybean raw material having a ratio of the soybean of 100 mass %; 90% or more of particles of the soybean raw material each have a particle diameter within a range of 100 mesh pass to 800 mesh pass, the soybean raw material has a nitrogen solubility index (NSI) from 30 to 80, the soybean raw material does not show oil exudation during pressurization treatment at a pressure of 0.8 MPa with a squeezing machine, the soybean raw material has a water content of 6 mass % or more and 7 mass % or less, and the soybean raw material has a first oil content of from 15 mass % to 30 mass % and a protein content of from 25 mass % to 60 mass %; and
    an extruder treatment step of subjecting the soybean raw material to an extruder processing treatment with a single-screw extruder or a twin-screw extruder to obtain the full-fat textured protein that is texturized, wherein the full-fat textured protein has a second oil content of from 15 mass % to 30 mass % and a protein content of from 25 mass % to 60 mass %.

4. The method of producing the full-fat textured protein according to claim 3, wherein the grinding step is performed in two stages of:

a coarse grinding step of grinding the soybean from 20 mesh pass to 40 mesh pass; and a fine grinding step of grinding the soybean from 100 mesh pass to 800 mesh mass.

5. The method of producing the full-fat textured protein according to claim 3, wherein the range of from 100 mesh pass to 800 mesh pass is from about 18 μm pass to about 140 μm pass.

6. The full-fat textured protein according to claim 1, wherein the range of from 100 mesh pass to 800 mesh pass is from about 18 μm pass to about 140 μm pass.

* * * * *